United States Patent
Wei et al.

(10) Patent No.: US 9,527,738 B2
(45) Date of Patent: Dec. 27, 2016

(54) METHOD FOR MAKING CARBON NANOTUBE FILM

(71) Applicants: Tsinghua University, Beijing (CN); HON HAI PRECISION INDUSTRY CO., LTD., New Taipei (TW)

(72) Inventors: Yang Wei, Beijing (CN); Hao-Ming Wei, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 868 days.

(21) Appl. No.: 13/729,258

(22) Filed: Dec. 28, 2012

(65) Prior Publication Data

US 2014/0110889 A1    Apr. 24, 2014

(30) Foreign Application Priority Data

Oct. 19, 2012 (CN) .......................... 2012 1 0399475

(51) Int. Cl.
  *C01B 31/02* (2006.01)
  *B82Y 40/00* (2011.01)
  *B82Y 30/00* (2011.01)

(52) U.S. Cl.
  CPC ............ *C01B 31/0253* (2013.01); *B82Y 30/00* (2013.01); *B82Y 40/00* (2013.01); *C01B 2202/08* (2013.01)

(58) Field of Classification Search
  CPC ........................ C01B 31/0253; C01B 31/026
  IPC .................................................. C01B 31/0253
  See application file for complete search history.

(56) References Cited

U.S. PATENT DOCUMENTS

| 6,972,056 B1 * | 12/2005 | Delzeit .................. | B82Y 30/00 134/1 |
| 2009/0208708 A1 * | 8/2009 | Wei ........................ | B82Y 30/00 264/164 |
| 2009/0301993 A1 | 12/2009 | Feng et al. | |
| 2010/0263783 A1 | 10/2010 | Feng et al. | |

(Continued)

FOREIGN PATENT DOCUMENTS

| CN | 101905877 | 12/2010 |
| CN | 102092701 A | 6/2011 |

(Continued)

OTHER PUBLICATIONS

"Silicon", Wikipedia, Feb. 15, 2006 accessed at https://en.wikipedia.org/w/index.php?title=Silicon&oldid=39689432 on Sep. 15, 2015.*

(Continued)

*Primary Examiner* — Alison L Hindenlang
(74) *Attorney, Agent, or Firm* — Zhigang Ma

(57) ABSTRACT

A method for making carbon nanotube array includes providing a carbon nanotube array formed on a surface of a substrate. The carbon nanotube array is stripped from the surface of the substrate. The carbon nanotube array is suspended in an inert gas environment or a vacuum environment. A temperature of the carbon nanotube array can be in a range from about 200° C. to about 2400° C. by heating the carbon nanotube array. In a state of heating the carbon nanotube array, a plurality of carbon nanotubes of the carbon nanotube array is selected and a carbon nanotube film is pulled out by a drawing tool.

20 Claims, 3 Drawing Sheets

(56) References Cited

U.S. PATENT DOCUMENTS

| | | |
|---|---|---|
| 2010/0301518 A1 | 12/2010 | Feng et al. |
| 2011/0139361 A1 | 6/2011 | Liu et al. |
| 2011/0155312 A1 | 6/2011 | Feng et al. |
| 2011/0159190 A1* | 6/2011 | Liu ..................... B82Y 30/00 427/294 |

FOREIGN PATENT DOCUMENTS

| | | |
|---|---|---|
| CN | 102107865 | 6/2011 |
| TW | 201040015 | 11/2010 |

OTHER PUBLICATIONS

Zhang, Xiabo; Jiang, K; Feng, C; Liu, P; Zhang, L; Kong, J; Zhang, T; Li, Q; Fan, S; "Spinning and Processing Continuous Yarns from 4-Inch Wafer Scale Super-Aligned Carbon Nanotube Arrays", Advanced Materials, 2006, 18, 1505-1510.*

* cited by examiner

METHOD FOR MAKING CARBON NANOTUBE FILM

RELATED APPLICATIONS

This application claims all benefits accruing under 35 U.S.C. §119 from China Patent Application No. 201210399475.3, filed on Oct. 19, 2012 in the China Intellectual Property Office, the disclosure of which is incorporated herein by reference.

BACKGROUND

1. Technical Field

The present application relates to a method for making carbon nanotube film.

2. Discussion of Related Art

A conventional method for making a carbon nanotube film is taught by US 2009/0301993A1 to Feng et al. The method includes steps of: (a) providing a carbon nanotube array; (b) treating the carbon nanotube array using plasma treatment such as a plasma etching process; (c) pulling out a plurality of yarns from the carbon nanotube array to form the carbon nanotube film using a tool such as adhesive tape, tweezers, clamps, or any tool allowing multiple carbon nanotubes to be gripped and pulled simultaneously.

However, there are some impurities in the carbon nanotube array, which lower the purity of the carbon nanotube film. Further, mechanical property of the carbon nanotube film is poor, because adjacent carbon nanotubes are only joined by van der Waals attractive force.

What is needed, therefore, is to provide a method for making carbon nanotube film with high purity and good mechanical property.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
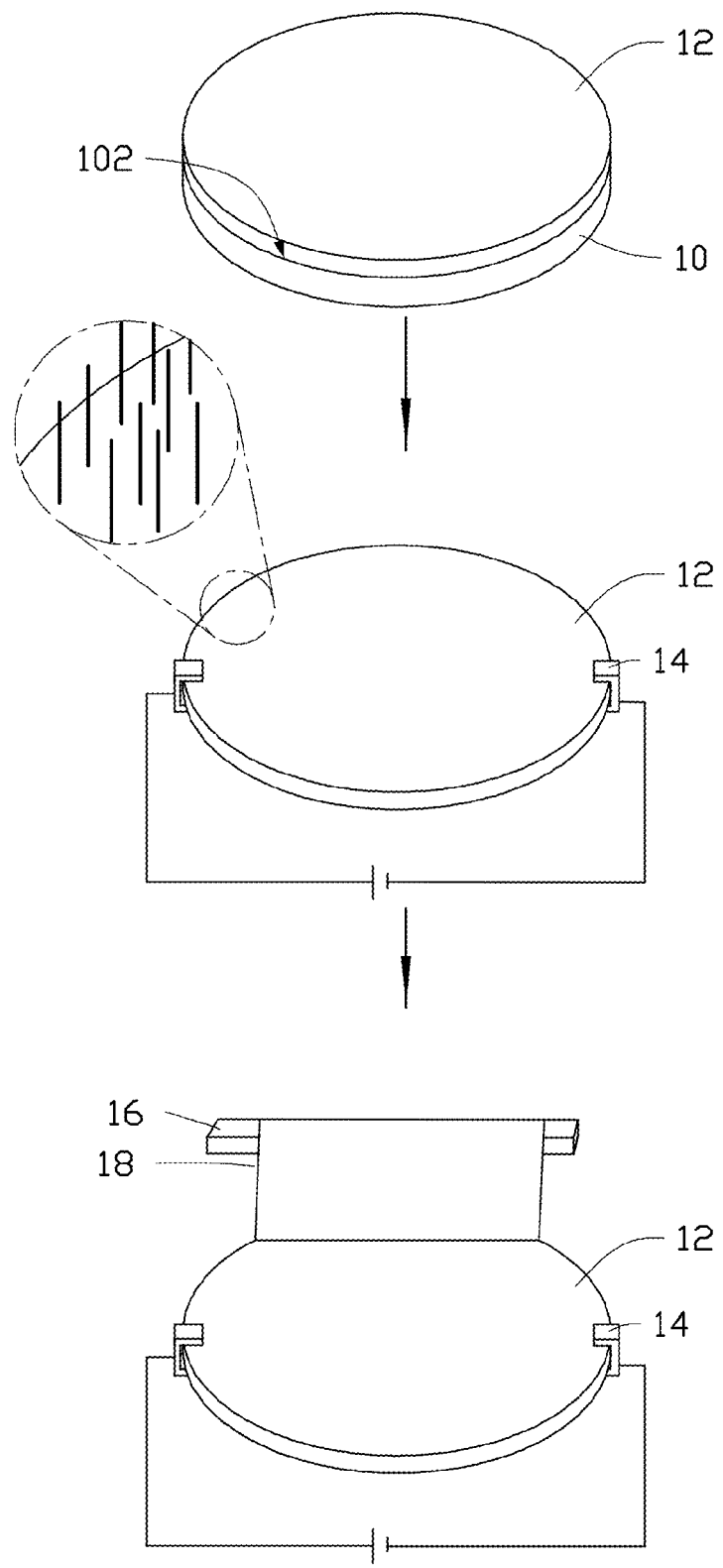
FIG. 1 is a schematic view of one embodiment of a method for making carbon nanotube film.
Figure 2:
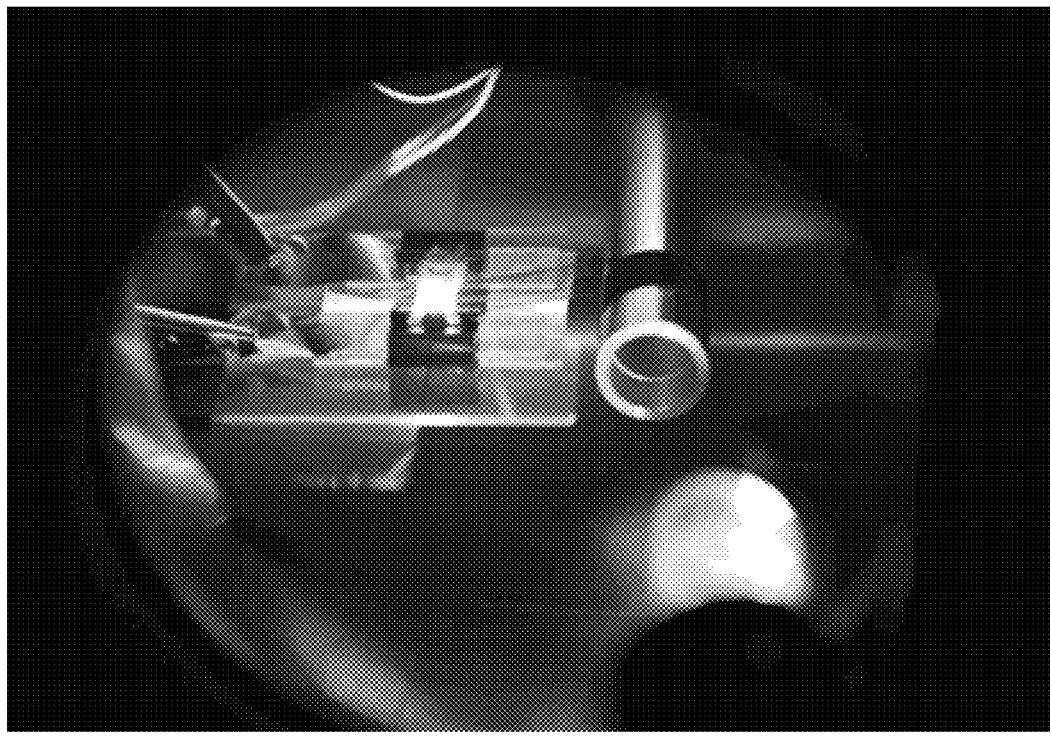
FIG. 2 is an optical image of the method of FIG. 1.

Referring to FIGS. 1 and 2, a method for making a carbon nanotube film of one embodiment includes steps of:

(S1), providing a carbon nanotube array 12 formed on a surface 102 of a substrate 10;

(S2), stripping the carbon nanotube array 12 from the surface 102 of the substrate 10, wherein the carbon nanotube array 12 suspends between at least two supporters 14;

(S3), heating the carbon nanotube array 12 to be in a range from about 200° C. to about 2400° C. in an inert gas environment or a vacuum environment; and (S4), selecting a plurality of carbon nanotubes of the carbon nanotube array 12 during the heating process and pulling out a carbon nanotube film 18 by a drawing tool 16.

In step (S1), the substrate 10 can be a substantially flat and smooth silicon substrate with a diameter of 4 inches, wherein the silicon substrate can be a P-type silicon wafer, an N-type silicon wafer, or a silicon wafer formed with an oxidized layer thereon. In one embodiment, a 4-inch, P-type silicon wafer is used as the substrate 10.

The carbon nanotube array 12 includes a plurality of carbon nanotubes substantially parallel to each other. The plurality of carbon nanotubes can be single-walled, double-walled, multi-walled carbon nanotubes, or any combination thereof. The plurality of carbon nanotubes which is single-walled has a diameter of about 0.5 nanometers (nm) to about 50 nm. The plurality of carbon nanotubes which is double-walled has a diameter of about 1.0 nm to about 50 nm. The plurality of carbon nanotubes which is multi-walled has a diameter of about 1.5 nm to about 50 nm. The plurality of carbon nanotubes has a height of about 100 nm to about 10 millimeters (mm), for example, the height of the plurality of carbon nanotubes is 100 microns, 500 microns, 1000 microns or 5 mm. In one embodiment, the plurality of carbon nanotubes has a height of about 100 microns to about 1000 microns.

In one embodiment, the carbon nanotube array 12 is fabricated by a chemical vapor deposition (CVD) process. The CVD process includes the steps of:

(S11), providing a substantially flat and smooth substrate 14, wherein the substrate 14 can be a P-type silicon substrate, an N-type silicon substrate, or a silicon substrate having oxide layer disposed thereon. In one embodiment, the substrate 14 is a P-type silicon substrate having a width of about 4 inches;

(S12), forming a catalyst on the surface of the substrate 14, wherein the catalyst can be made of iron, cobalt, nickel, or any combination alloy thereof;

(S13), annealing the substrate 14 with the catalyst at a temperature ranging from about 700° C. to about 900° C. in air for about 30 minutes to about 90 minutes;

(S14), heating the substrate 14 with the catalyst at a temperature ranging from about 500° C. to about 740° C. in a furnace with a protective gas therein; and (S15), supplying a carbon source gas to the furnace for about 5 minutes to about 30 minutes and growing the carbon nanotube array 10, wherein the carbon source gas may be hydrocarbon gas, such as ethylene, methane, acetylene, ethane, or any combination thereof.

In step (S2), the carbon nanotube array 12 can be totally stripped from the substrate 10. In one embodiment, the carbon nanotube array 12 is totally scraped from the substrate 10 by a knife or other similar devices along a direction substantially parallel to the surface 102 of the substrate 10. In the process of scraping, two adjacent carbon nanotubes are joined together by van der Waals attractive force, therefore, the carbon nanotube array 12 has a free-standing structure The term "free-standing" includes, but is not limited to, a carbon nanotube array 12 that does not need to be supported by a base. For example, a free-standing carbon nanotube array 12 can sustain itself when it is hoisted by a portion thereof without any significant damage to its structural integrity. So, if the free-standing carbon nanotube array 12 is placed between at least two separate supporters 14, a portion of the free-standing carbon nanotube array 12 not in contact with the at least two supporters 14 would be suspended between the at least two supporters 14 and yet maintain structural integrity.

The at least two supporters 14 can be made of a conductive material, such as high-temperature metal, alloy, conductive polymer, ceramics, and so on. The high-temperature metal can be tungsten, molybdenum, and so on. The melting point of the supporter 14 is greater than the temperature of the carbon nanotube array 12. In one embodiment, the carbon nanotube array 12 suspends between two separate tungsten electrodes. The supporters 14 can be made of non-conductive material, and two electrodes are used to electrify the carbon nanotube array 12.

The structure of the supporters 14 can be selected according to need, in one embodiment, the supporters 14 are square electrodes. When the carbon nanotube array 12 is suspended between the supporters 14, at least one supporter 14 can be under a first side of the carbon nanotube array 12, and at least one supporter 14 can be under a second side of the carbon nanotube array 12 opposite to the first side. In one embodiment, the carbon nanotube array 12 is suspended between two separate electrodes; one electrode is under the first side of the carbon nanotube array 12, and the other electrode is under the second side of the carbon nanotube array 12.

In the step (S3), the carbon nanotube array 12 can be placed in a chamber (not illustrated). In one embodiment, the chamber is filled with nitrogen, ammonia or inert gas. In another embodiment, a pressure in the chamber is less than 100 Pa. In yet another embodiment, a pressure in the chamber is in a range from about $10^{-9}$ Pa to about $10^{-3}$ Pa.

A method for heating the carbon nanotube array 12 can be selected according to need, for example, electrifying the carbon nanotube array 12, or heating the carbon nanotube array 12 in a furnace in the inert gas environment or the vacuum environment. In one embodiment, the carbon nanotube array 12 is suspended between two separate electrodes, when an external power supply is connected to the two separate electrodes, current flows from one electrode to another electrode. In an inert gas environment or a vacuum environment, when a voltage applied to the two conductive supporters 14 is increased in a range from about 80 volts to about 150 volts, the carbon nanotube array 12 emits electromagnetic waves having a relatively short wave length. When the voltage is further increased, the carbon nanotube array 12 emits visible light having colors such as red, yellow light, and so on. A temperature of the carbon nanotube array 12 can be in a range from about 200° C. to about 2400° C.

In the process of making the carbon nanotube array 12, some impurities such as carbonaceous or residual catalyst particles are inevitably in the carbon nanotube array 12. The temperature of the carbon nanotube array 12 can be in a range from about 200° C. to about 2400° C. by electrifying the carbon nanotube array 12. The impurities of the carbon nanotube array 12 melt and evaporate. Therefore, the carbon nanotube film 18 obtained from the carbon nanotube array 12 has high purity.

In the step (S4), in the state of electrifying the carbon nanotube array 12, the carbon nanotube film 18 is obtained by extracting the plurality of carbon nanotubes of the carbon nanotube array 12 by the substeps of:

(S41), selecting the plurality of carbon nanotubes of the carbon nanotube array 12 having a determined width, and then using the drawing tool 16 with the predetermined width to secure ends of the plurality of carbon nanotubes of the carbon nanotube array 12; and (S42), pulling the drawing tool 16 away from the carbon nanotube array 12 at an even/uniform speed to make the plurality of carbon nanotubes of the carbon nanotube array 12 separate from the carbon nanotube array 12.

In the step (S42), the pulling direction can be substantially perpendicular to the growing direction of the carbon nanotube array 12. The drawing tool 16 can be a nipper, a clamp, and so on. The melting point of the drawing tool 16 is greater than the temperature of the carbon nanotube array 12. The drawing tool 16 is made of high-temperature metal, ceramics, and so on. The high-temperature metal can be tungsten, molybdenum, and so on.

In the step (S42), during the extracting process, when the ends of the plurality of carbon nanotubes are drawn out, other carbon nanotubes are also drawn out in a manner such that ends of the carbon nanotubes are connected with ends of adjacent carbon nanotubes by van der Waals attractive force between the ends of the carbon nanotubes. Therefore, the continuous carbon nanotube film 18 can be formed.

In the state of electrifying the carbon nanotube array 12, the temperature of the carbon nanotube array 12 can be in a range from about 200° C. to about 2400° C. For example, the temperature of the carbon nanotube array 12 can be 200° C., 500° C., 700° C., 1000° C., 1200° C., 1500° C., 2000° C., 2400° C. In one embodiment, the temperature of the carbon nanotube array 12 is 1200° C.

In the state of electrifying the carbon nanotube array 12, a temperature of the plurality of carbon nanotubes of the carbon nanotube array 12 can be in a range from about 200° C. to about 2400° C., because the temperature of carbon nanotube array 12 can be in a range from about 200° C. to about 2400° C. During the extracting process, the temperature of the plurality of carbon nanotubes away from the carbon nanotube array 12 gradually decreases. Therefore, some carbon nanotubes of the carbon nanotube film 18 fuse with each other to form carbon-carbon bonds between some adjacent carbon nanotubes, which improve the mechanical property of the carbon nanotube film 18.

The carbon nanotube film 18 includes a plurality of carbon nanotubes joined end to end. Some carbon nanotubes of the carbon nanotube film 18 are joined by van der Waals attractive force. Some carbon nanotubes of the carbon nanotube film 18 fuse with each other. Therefore, the carbon nanotube film 18 has a free-standing structure.

Before heating the carbon nanotube array 12, the plurality of carbon nanotubes of the carbon nanotube array 12 can be pulled out of a carbon nanotube segment by the drawing tool 16. The carbon nanotube array 12 can be heated to be in a range from about 200° C. to about 2400° C. in the inert gas environment or the vacuum environment, with the plurality of carbon nanotubes constantly being pulled out to obtain the carbon nanotube film 18. In this situation, the drawing tool 16 can be made of high-temperature metal, low-temperature metal, ceramics, and so on.

The carbon nanotube film 18 includes a plurality of successive and oriented carbon nanotube segments. Some carbon nanotube segments are joined end to end by van der Waals attractive force. Some carbon nanotube segments are joined by carbon-carbon bonds. Each carbon nanotube segment includes a plurality of carbon nanotubes substantially parallel to each other, and the plurality of paralleled carbon nanotubes are in contact with each other and combined by van der Waals attractive force or carbon-carbon bond therebetween.

Figure 3:
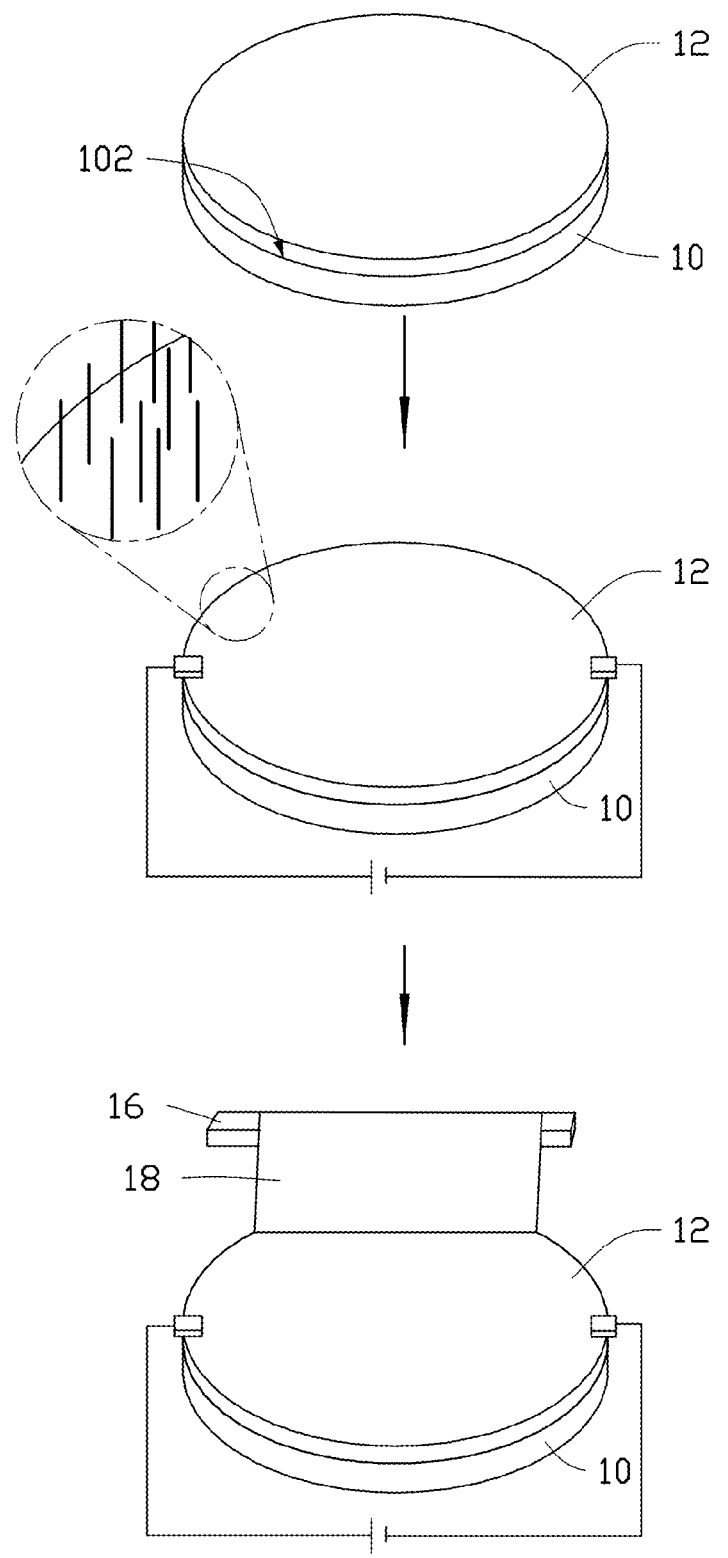
FIG. 3 shows a schematic view of another embodiment of a method for making carbon nanotube film.

Referring to FIG. 3, a method for making a carbon nanotube film 18 of another embodiment includes the steps of:

(S1), providing a carbon nanotube array 12 formed on a surface 102 of a substrate 10;

(S2), heating the carbon nanotube array 12, wherein the carbon nanotube array 12 and the substrate 10 are in an inert gas environment or a vacuum environment; and (S3), selecting a plurality of carbon nanotubes of the carbon nanotube array 12 during the heating process and pulling out a carbon nanotube film 18 by a drawing tool 16.

FIG. 3 shows another embodiment of the method for making the carbon nanotube film 18 where the carbon nanotube array 12 is not stripped from the substrate 10. A melting point of the substrate 10 is greater than the temperature of the carbon nanotube array 12. In one embodiment, the substrate 10 is made of silicon, the temperature of the carbon nanotube array 12 is in a range from about 700° C. to about 1300° C. The carbon nanotube array 12 can be transferred to other bases. When a melting point of the bases is greater than 2400° C., the temperature of the carbon nanotube array 12 can be 2400° C.

A method for electrifying the carbon nanotube array 12 located on the surface 102 of the substrate 10 can be selected according to need. In one embodiment, a current passes through the carbon nanotube array 12 by connecting an external power supply to two separate electrodes located in the carbon nanotube array 12.

The carbon nanotube film 18 made by the above-described method has high purity. In the carbon nanotube film 18, some carbon nanotubes are joined by van der Waals attractive force, and some carbon nanotubes are joined by carbon-carbon bonds, which improve the mechanical property of the carbon nanotube film 18. Moreover, the method for making the carbon nanotube film 18 is simple and easy to operate.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A method for making a carbon nanotube film comprising:
   (S1) providing a carbon nanotube array formed on a surface of a substrate;
   (S2) stripping the carbon nanotube array from the surface of the substrate and suspending the carbon nanotube array;
   (S3) heating the carbon nanotube array by electrifying the carbon nanotube array to be in a range from about 200° C. to about 2400° C. in an inert gas environment or a vacuum environment, and a plurality of impurities in the carbon nanotube array is melted and evaporated; and
   (S4) selecting a plurality of carbon nanotubes of the carbon nanotube array during the heating process and pulling out the carbon nanotube film by a drawing tool.

2. The method of claim 1, wherein in the step (S1), the carbon nanotube array comprises a plurality of carbon nanotubes substantially parallel to each other and substantially perpendicular to the surface of the substrate.

3. The method of claim 1, wherein in the step (S2), the carbon nanotube array is totally scraped from the substrate along a direction substantially parallel to the surface of the substrate.

4. The method of claim 3, wherein in the process of scraping, adjacent carbon nanotubes joined together by van der Waals attractive force, so that the carbon nanotube array has a free-standing structure.

5. The method of claim 1, further comprising at least two separate supporters to suspend the carbon nanotube array.

6. The method of claim 5, further comprising two separate electrodes to suspend the carbon nanotube array.

7. The method of claim 6, wherein the two separate electrodes are made of high-temperature metal, ceramics, or conductive polymer.

8. The method of claim 1, further comprising a chamber, and the carbon nanotube array is placed in the chamber.

9. The method of claim 8, wherein the chamber is filled with nitrogen, ammonia, or inert gas.

10. The method of claim 8, wherein a pressure in the chamber is in a range from about $10^{-9}$ Pa to about $10^{-3}$ Pa.

11. The method of claim 1, wherein in the step (S3), a temperature of the carbon nanotube array is in a range from about 1000° C. to about 2400° C.

12. The method of claim 11, wherein the temperature of the carbon nanotube array is about 1200° C.

13. The method of claim 1, wherein in the step (S4), the drawing tool is made of high-temperature metal, low-temperature metal, or ceramics.

14. The method of claim 1, wherein in the step (S4), a temperature of the plurality of carbon nanotubes away from the carbon nanotube array gradually decreases, to cause the plurality of carbon nanotubes to fuse with each other to form carbon-carbon bonds between adjacent carbon nanotubes.

15. A method for making a carbon nanotube film comprising:
   (S1) providing a carbon nanotube array formed on a surface of a substrate;
   (S2) stripping the carbon nanotube array from the surface of the substrate and suspending the carbon nanotube array;
   (S3) selecting a plurality of carbon nanotubes of the carbon nanotube array and pulling out a carbon nanotube segment; and
   (S4) heating the carbon nanotube array to be in a range from about 200° C. to about 2400° C. in an inert gas environment or a vacuum environment, while constantly pulling out the plurality of carbon nanotubes to obtain the carbon nanotube film, and a plurality of impurities in the carbon nanotube array is melted and evaporated.

16. A method for making a carbon nanotube film comprising:
   (S1) providing a carbon nanotube array formed on a surface of a substrate;
   (S2) heating the carbon nanotube array, wherein the carbon nanotube array and the substrate are in an inert gas environment or a vacuum environment, and a plurality of impurities in the carbon nanotube array is melted and evaporated; and
   (S3) selecting a plurality of carbon nanotubes of the carbon nanotube array during the heating process and pulling out the carbon nanotube film by a drawing tool, and a temperature of the plurality of carbon nanotubes away from the carbon nanotube array gradually decreases, to cause the plurality of carbon nanotubes to fuse with each other to form carbon-carbon bonds between adjacent carbon nanotubes.

17. The method of claim 16, wherein in the step (S2), a melting point of the substrate is greater than a temperature of the carbon nanotube array.

18. The method of claim 17, wherein the substrate is made of silicon, and the temperature of the carbon nanotube array is in a range from about 700° C. to about 1300° C.

19. The method of claim 16, wherein in the step (S1), the carbon nanotube array is transferred to other bases.

20. The method of claim 16, wherein the inert gas environment is filled with nitrogen, ammonia, or inert gas.

* * * * *